United States Patent [19]

König et al.

[11] 4,446,291
[45] May 1, 1984

[54] PROCESS FOR THE CONTINUOUS PRODUCTION OF ACRYLONITRILE-VINYL CHLORIDE COPOLYMERS

[75] Inventors: Joachim König, Berg.Gladbach; Karl-Erwin Schnalke, Cologne; Carlhans Süling, Odenthal; Horacek: Götz, Leverkusen, all of Fed. Rep. of Germany

[73] Assignee: Bayer Aktiengesellschaft, Leverkusen, Fed. Rep. of Germany

[21] Appl. No.: 818,598

[22] Filed: Jul. 25, 1977

[30] Foreign Application Priority Data

Jul. 27, 1976 [DE] Fed. Rep. of Germany ....... 2633592

[51] Int. Cl.$^3$ .................... C08F 214/06; C08F 220/44
[52] U.S. Cl. .................................... 526/209; 526/222; 526/229; 526/234; 526/342
[58] Field of Search ............... 526/209, 222, 229, 234, 526/342

[56] References Cited

U.S. PATENT DOCUMENTS

| | | | |
|---|---|---|---|
| 3,936,511 | 2/1976 | König et al. | 526/342 |
| 3,940,368 | 2/1976 | Console et al. | 526/342 |
| 3,975,338 | 8/1976 | Tsubota et al. | 526/342 |

*Primary Examiner*—Harry Wong, Jr.
*Attorney, Agent, or Firm*—Sprung, Horn, Kramer & Woods

[57] ABSTRACT

The invention relates to a process for the continuous production of a chemically uniform copolymer comprising 15 to 50% by weight of acrylonitrile and from 85 to 50% by weight of vinyl chloride and, optionally, up to 4% by weight of at least one other copolymerized ethylenically unsaturated comonomer containing acid groups by emulsion polymerization, wherein the copolymerization reaction is carried out with a monomer ratio of acrylonitrile to vinyl chloride of from 0.02 to 0.5, in the presence of a redox catalyst and in an acidic medium.

10 Claims, No Drawings

PROCESS FOR THE CONTINUOUS PRODUCTION OF ACRYLONITRILE-VINYL CHLORIDE COPOLYMERS

This invention relates to a process for the continuous production of copolymers comprising 15 to 50% by weight of acrylonitrile and 85 to 50% by weight of vinyl chloride and, optionally, other copolymerisable compounds.

Copolymers of acrylonitrile and vinyl chloride are suitable for the production of filaments and fibres, so-called modacrylics. In addition to the usual favourable fibre properties, modacrylics, by virtue of their chlorine content, have a high degree of non-inflammability and excellent flameproof properties which make them eminently suitable for use as wig materials, artificial furs, children's clothing, carpeting, decorative materials and curtaining.

It is known that acrylonitrile-vinyl chloride copolymers can be produced by emulsion polymerisation, in which case the polymerisation reaction is normally carried out in the presence of a large excess of the vinyl chloride. By maintaining a defined ratio between the two monomers, acrylonitrile and vinyl chloride, in the monomer mixture throughout the entire polymerisation reaction, chemically uniform, compatible copolymers suitable for use as fibre material are formed. Normally the total quantity of vinyl chloride is added at the beginning of the polymerisation reaction. The necessary monomer ratio is adjusted by introducing the more quickly polymerising acrylonitrile in measured quantities by a semicontinuous metering process.

In cases where the polymers are used as a starting material for fibres, rigorous demands are imposed upon their chemical homogeneity. Accordingly, the necessary monomer ratio has to be very accurately adjusted and maintained at a constant value during the polymerisation reaction which, in the case of batch-type processes, involves elaborate monitoring of the polymerisation reaction on account of different latent times and a non-constant polymerisation velocity.

A continuous polymerisation process affords advantages over the batch process because, in continuous polymerisation processes, the potential disturbances during the start-up period disappear, the necessary monomer ratio is easier to maintain and, furthermore, the excess and unpolymerised vinyl chloride can be recycled under favourable conditions.

German Auslegeschrift No. 962,472 describes a process for the continuous copolymerisation of mixtures of 35 to 65% by weight of acrylontrile, 20 to 60% by weight of vinyl chloride and 5 to 15% by weight of another vinyl compound which contains the vinyl group attached directly to an oxygen or nitrogen atom. Polymerisation is carried out in an aqueous emulsion in the presence of a catalyst system comprising potassium peroxodisulphate and triethanolamine at pH-value of from 6 to 7. This process gives polymers of which the spinning solutions show only a slight increase in viscosity on standing and are therefore suitable for spinning.

However, this process cannot be used for the production of pure acrylonitrile-vinyl chloride copolymers because a third comonomer, for example vinyl acetate, vinyl ether, vinyl pyrrolidone etc. is of crucial significance to good viscosity behaviour on the part of the spinning solution. In the case of the pure acrylonitrile-vinyl chloride copolymer, there is an overrapid increase in the viscosity of the spinning solutions which gives rise to considerable difficulties in the spinning process.

However, ternary copolymers of acrylonitrile, vinyl chloride and another neutral comonomer, for example vinyl acetate or methyl acrylate, are less suitable for use as a starting material for fibres because filaments and fibres of such terpolymers show an increased tendency towards shrinkage during dyeing.

A three-stage cascade for the continuous copolymerisation of acrylonitrile and vinyl chloride in aqueous emulsion is proposed in Plaste and Kautschuk, 22, 316 (1975). In order to avoid troublesome phase separation and coagulation, the apparatus does not have any pipes between its various vessels which thus avoids possible blockages and hence the need to shut down the installation. Instead, a reactor housing with three sections built concentrically into one another is used, combining thee reactors in a single housing without any connecting pipes. The necessary stability of the monomer ratio is not guaranteed by periodic measured introduction of the more active acrylontrile, but instead by removing the less active and lower boiling vinyl chloride which requires a difficult temperature control program. This process is technically extremely complicated and imposes great demands upon the monitoring of the polymerisation reaction.

Accordingly, the object of the present invention is to provide a process for the continuous copolymerisation of acrylonitrile and vinyl chloride in aqueous emulsion which is easy to carry out on a commercial scale and gives a product of high quality.

It has now been found that the production of chemically uniform acrylonitrile-vinyl chloride copolymers by emulsion polymerisation can readily be carried out continuously in a vessel equipped with a stirrer providing the copolymerisation reaction is carried out with a certain monomer ratio of acrylonitrile to vinyl chloride, in the presence of a redox catalyst with a certain molar ratio of the reducing component to the oxidising component and at a certain pH-value.

Accordingly, the present invention relates to a process for the continuous production of a chemically uniform copolymer comprising from 15 to 50% by weight of acrylonitrile and from 85 to 50% by weight of vinyl chloride and, optionally, up to 4% by weight of at least one other copolymerised ethylenically unsaturated comonomer containing acid groups by emulsion polymerisation, wherein the copolymerisation reaction is carried out with a monomer ratio of acrylonitrile to vinyl chloride of from 0.02 to 0.5 (ratio by weight), in the presence of a redox catalyst of compounds of sulphurous acid and peroxodisulphates in a molar ratio of reducing to oxidising component of from 8:1 to 100:1 and at a pH-value of from 2.5 to 4.

The process according to the invention is preferably used for the production of acrylonitrile-vinyl chloride copolymers which do not contain any other comonomers because copolymers such as these on their own combine good spinning properties with good product quality. The monomer ratio of acrylonitrile to vinyl chloride is adjusted to a ratio by weight of from 0.02 to 0.5 and is selected in such a way that the composition of the monomer mixture corresponds to the required composition of the copolymer.

In order to improve the dyeability of the filaments and fibres, it is possible to use as copolymerisable ethylenically unsaturated compounds ionic additives with acid groups of which up to 4% by weight and preferably up to 3% by weight may be present in the copolymers and which do not adversely affect the shrinkage behaviour of the resulting filaments and fibres. Comonomers which contain acid groups for example, $-SO_3-$ or $-SO_2-NH-SO_2-$ are, e.g. styrene sulphonic acid, allyl sulphonic acid, methallyl sulphonic acid, 2-acrylamido-2-methyl propane sulphonic acid, acryloyloxy propyl sulphonic acid, methacryloyloxy propyl sulphonic acid and salts, preferably alkali and ammonium salt of these sulphonic acids, also such compounds as phenyl-(3-methacrylamidophenyl)-disulphimide.

In the process according to the present invention, the polymerisation reaction is initiated by the addition of water-soluble redox systems of compounds of sulphurous acid and peroxodisulphates in a molar ratio of reducing conmponent to oxidising component of from 8:1 to 100:1, preferably from 10:1 to 30:1. Preferred reducing components are alkali sulphites, alkali bisulphites, alkali disulphites, formaldehyde sulphoxylates or sulphur dioxide. Alkali or ammonium peroxodisulphate is preferably used as the oxidising component. The redox catalysts are preferably used in a total concentration of from 0.5 to 4% by weight, based on the total monomer content.

In order to obtain special effects, chain transfer agents, for example mercaptans, may be additionally used.

The process according to the invention is carried out in an acid emulsion at a pH-value in the range from 2.5 to 4, preferably from 2.8 to 3.8. The required pH-value may be adjusted by the addition of a buffer system or of an acid. The acid used may be any strong or medium-strength inorganic or organic acid which is stable in the presence of the redox system. It is preferred to use such acids as sulphuric acid, nitric acid, phosphoric acid and acetic acid.

Preferred emulsifiers for carrying out the process according to the invention are anion-active emulsifiers which are active in acidic medium, for example sulphuric acid derivatives, sulphonic acids, phosphoric acid derivatives or phosphonic acids. Extremely good results are obtained with alkyl sulphonates preferably containing from 10 to 18 carbon atoms in the alkyl chain, alkylaryl sulphonates preferably containing from 8 to 14 carbon atoms in the alkyl chain, fatty alcohol sulphates and sulphosuccinic acid esters. Sodium lauryl sulphate is preferably used. The anion-active emulsifiers are used in concentrations of from 0.75 to 80% by weight, based on the total monomer content.

Particularly, good results are obtained when non-ionic emulsifiers are added to the polymerisation mixture in addition to the anion-active emulsifiers. Suitable non-ionic emulsifiers are polyglycol ethers obtained by the addition of a relatively large number of ethylene oxide or propylene oxide molecules to fatty alcohols, alkyl phenols, aralkyl phenols, fatty acids, resinic acids or fatty acid amides. Examples are oleyl polyethylene glycol ether, coconut oil alcohol polyethylene glycol ether, i-nonyl phenol polyethylene glycol ether, oleic acid polyethylene glycol ether ester or abietic acid polyethylene glycol ether ester with ethoxylation levels of from 6 to 40.

Both in the case of the anion-active emulsifiers and in the case of the non-ionic emulsifiers, it is also possible to use the mixtures of difference emulsifiers. In cases where mixtures of anion-active and non-ionic emulsifiers are used, the total concentration of the emulsifiers should amount to between 0.75 and 8% by weight, based on the total monomer content. In this case, the ratio by weight of the anion-active to non-ionic emulsifier preferably amounts to between 10:1 and 1.5:1.

Temperatures in the range from 10° to 50° C. have proved to be suitable for carrying out the polymerisation reaction. Temperatures in the range of from 20° C. to 40° C. are particularly advantageous. Pressure-resistant and corrosion-resistant reaction vessels which are made for example of VA-steel or enamel or which are coated with plastics are suitable for carrying out the polymerisation reaction. It is preferred to use simple vessels equipped with a stirrer which enable the reaction volume to be kept constant, or cascades of several stirrer-equipped vessels arranged consecutively.

The process according to the invention gives latices which show only a limited tendency towards coagulate formation. Accordingly, the process according to the invention provides for the production of latices with a high polymer content in the absence of coagulation which would lead to undesirable wall deposits and blockages and which would complicate processing.

The latices can be precipitated in the usual way, for example with acetone or aqueous solutions of electrolytes, such as sodium chloride, calcium chloride, magnesium sulphate, zinc sulphate and aluminium sulphate.

The products obtained in this way are soluble, for example, in acetone, acetonitrile, dimethyl formamide, dimethyl acetamide and dimethyl sulphoxide. They show a high degree of whiteness and high thermal stability both in solid form and also in solution and evolve only small amounts of hydrogen chloride, even at elevated temperatures. Even with high vinyl chloride contents, the polymers have high K-values and high molecular weights in order to guarantee good spinning properties. The solutions of the polymers show favourable viscosity behaviour, in other words the viscosity of their solutions increases only slightly after prolonged standing, even at elevated temperature. The polymers can be processed by conventional wet and dry spinning processes into filaments and fibres with good textile properties, excellent natural colour and a high degree of non-inflammability.

The process according to the invention is illustrated by the following Examples in which the parts quoted represent parts by weight. The K-values of the polymers quoted in the Examples were determined at 25° C. in 0.5% dimethyl formamide solution in accordance with Fikentscher, Cellulosechemie 13, (1932), page 58.

EXAMPLE 1

21,000 parts of denionised water, 150 parts of sodium disulphite, 200 parts of sodium lauryl sulphate, 0.05 part or iron(II)ammonium sulphate, 70 parts of 1 N sulphuric acid and 1200 parts of a latex of acrylonitrile-vinyl chloride copolymer with a solids content of 6%, were introduced into a polymerisation autoclave. The oxygen was removed by passing over nitrogen, 420 parts of acrylonitrile and 7100 parts of vinyl chloride were introduced under pressure and a temperature of 30° C. was adjusted. The polymerisation reaction was initiated by the introduction under pressure of a solution of 10.5 parts of ammonium peroxodisulphate in 700 parts of deionised water. 1200 parts of acrylonitrile and a solution of 18 parts of ammonium peroxodisulphate and 100 parts of 1 N sulphuric acid in 1100 parts of deionised water were then immediately pumped in uniformly over a period of 6 hours, a solids content of 12.0% by weight being reached after 6 hours.

Polymerisation was then carried out continuously, the following components being uniformly pumped in per hour at 30° C.:

| Solution 1: | sodium disulphite | 30 parts |
|---|---|---|
| | sodium lauryl sulphate | 40 parts |
| | iron(II)ammonium sulphate | 0.01 part |
| | deionised water | 2200 parts |
| Solution 2: | ammonium peroxodisulphate | 4.2 parts |
| | 1 N sulphuric acid | 30 parts |
| | deionised water | 2200 parts |
| Solution 3: | acrylonitrile | 320 parts |
| Solution 4: | vinyl chloride | 1500 parts |

The autoclave was kept filled to a level of 31 liters. 6325 parts per hour of latex (including unreacted vinyl chloride) were removed and vented with removal of the excess vinyl chloride by distillation. The latex samples removed and the precipitated polymers showed the following analytical data:

| Polymerisation time (h) | Solids (%) | Cl—content (%) | N—content (%) | K—value |
|---|---|---|---|---|
| 15 | 11.2 | 31.9 | 10.92 | 76 |
| 19 | 10.9 | 32.15 | 10.8 | 77 |
| 23 | 10.8 | 31.7 | 11.0 | 78 |
| 27 | 11.0 | 31.6 | 11.1 | 80 |
| 29 | 11.3 | 31.9 | 11.0 | 80 |
| 31 | 11.5 | 32.1 | 10.9 | 80.5 |
| 35 | 11.2 | 32.0 | 11.0 | 80 |
| 39 | 11.3 | 32.1 | 10.85 | 79.5 |
| 43 | 11.0 | 31.8 | 10.9 | 80 |

For working up, the vented latex obtained after a polymerisation time of 12 hours was collected, 200 parts of aluminium sulphate and 100 parts of 1 N sulphuric acid were added to it, followed by treatment with steam for 15 minutes at 95° C. The precipitated polymer was centrifuged, washed and dried. An average of 5400 parts/h of polymer was obtained.

EXAMPLE 2

Example 1 was continued after a polymerisation time of 43 hours with a modified acrylonitrile input of 280 parts of acrylonitrile per hour, the input of the remaining components being as described in Example 1. A new stationary operation al condition prevailed after about 12 hours. The following analytical data were determined:

| Polymerisation time (h) | solids (%) | Cl—content (%) | N—content (%) | K—value |
|---|---|---|---|---|
| 55 | 11.5 | 33.6 | 10.2 | 79.5 |
| 59 | 11.0 | 33.9 | 10.05 | 78.5 |
| 67 | 10.9 | 33.95 | 10.0 | 80 |
| 71 | 11.0 | 33.55 | 10.2 | 80 |
| 75 | 10.7 | 33.1 | 10.3 | 81 |
| 79 | 11.0 | 33.0 | 10.4 | 80.5 |
| 87 | 10.8 | 33.0 | 10.35 | 78.5 |
| 91 | 10.8 | 33.05 | 10.4 | 78.5 |
| 97 | 11.0 | 33.85 | 9.95 | 78 |

Working up was carried out in the same way as in Example 1. An average of 5200 parts/h of polymer was obtained.

EXAMPLE 3

Polymerisation was initiated in the same way as described in Example 1 and, after a start-up period of 6 hours, is switched to continuous working. The following components were uniformly pumped in per hour at a temperature of 30° C.:

| Solution 1: | sodium disulphite | 30 parts |
|---|---|---|
| | sodium lauryl sulphate | 40 parts |
| | iron(II)ammonium sulphate | 0.01 part |
| | deionised water | 2200 parts |
| Solution 2: | ammonium peroxodisulphate | 4.2 parts |
| | 1 N sulphuric acid | 30 parts |
| | deionised water | 2200 parts |
| Solution 3: | acrylonitrile | 180 parts |
| Solution 4: | vinyl chloride | 1500 parts |

The autoclave was kept filled to a level of 33 liters. 6185 parts/h of latex (including unreacted vinyl chloride) were removed per hour and vented.

The latex samples removed and the precipitated polymers showed the following analytical data:

| Polymerisation time (h) | Solids (%) | Cl—content (%) | N—content (%) | K—value |
|---|---|---|---|---|
| 20 | 11.8 | 39.85 | 7.2 | 72 |
| 26 | 12.0 | 40.15 | 7.1 | 72 |
| 32 | 12.2 | 40.75 | 7.0 | 72 |
| 38 | 12.0 | 40.95 | 6.8 | 72 |
| 44 | 12.4 | 41.0 | 6.8 | 72.5 |
| 50 | 12.0 | 41.0 | 6.85 | 73 |
| 56 | 12.2 | 40.9 | 6.8 | 73 |

Working up was carried out in the same way as described in Example 1. An average of 5600 parts/h of polymer was obtained.

EXAMPLE 4

21,000 parts of deionised water, 150 parts of sodium disulphite, 200 parts of sodium lauryl sulphate, 0.05 part of iron(II)ammonium sulphate, 70 parts of 1 N sulphuric acid and 1200 parts of a latex of acrylonitrile-vinyl chloride copolymer with a solids content of 6% were introduced into a polymerisation autoclave. After nitrogen had been passed over, 420 parts of acrylonitrile and 7100 parts of vinyl chloride were introduced under pressure and a temperature of 30° C. was adjusted. The polymerisation reaction was initiated by the addition under pressure of a solution of 10.5 parts of ammonium peroxodisulphate in 1000 parts of deionised water. The following components were then uniformly pumped in per hour at a temperature of 30° C.:

| Solution 1: | sodium disulphite | 22.5 parts |
|---|---|---|
| | sodium lauryl sulphate | 30 parts |
| | iron(II)ammonium sulphate | 0.0075 part |
| | deionised water | 1650 parts |
| Solution 2: | ammonium peroxodisulphate | 3.1 parts |
| | 1 N sulphuric acid | 22.5 parts |
| | deionised water | 1650 parts |
| Solution 3: | acrylonitrile | 300 parts |
| Solution 4: | vinyl chloride | 1150 parts |

The autoclave was kept filled to a level of 33 liters. 4827 parts/h of latex (including unreacted vinyl chloride) were removed and vented with removal of the excess vinyl chloride by distillation. The latex samples removed and the precipitated polymers showed the following analytical data:

| Polymerisation time (h) | Solids (%) | Cl—content (%) | N—content (%) | K—value |
|---|---|---|---|---|
| 24 | 14.5 | 33.0 | 10.35 | 77 |
| 30 | 14.5 | 32.95 | 10.4 | 76.5 |
| 36 | 15 | 32.6 | 10.5 | 77 |
| 42 | 15 | 33.0 | 10.4 | 78.5 |
| 48 | 14.8 | 33.3 | 10.3 | 77.5 |
| 54 | 15.0 | 32.8 | 10.5 | 77.5 |
| 60 | 15.0 | 33.6 | 10.1 | 78.5 |
| 66 | 14.5 | 33.55 | 10.2 | 78.5 |
| 72 | 15.0 | 33.6 | 10.2 | 78 |
| 78 | 15.0 | 33.1 | 10.45 | 78 |
| 84 | 15.0 | 33.3 | 10.2 | 77.5 |

Working up was carried out in the same way as described in Example 1. An average of 5300 parts/h of polymer was obtained.

EXAMPLE 5

33,500 parts of a latex containing 13% by weight of acrylonitrile-vinyl chloride copolymer were produced in a polymerisation autoclave in the same way as described in Example 1, except that 200 parts of sodium lauryl sulphate and 30 parts of i-nonyl phenol polyethylene glycol ether with an ethoxylation level of 30 were used as emulsifiers. Polymerisation was then carried out continuously, the following components being uniformly pumped in per hour at 30° C.:

| Solution 1: | sodium disulphite | 30 parts |
| | sodium lauryl sulphate | 30 parts |
| | i-nonyl phenyl polyethylene glycol ether (ethoxylation level 30) | 4.2 parts |
| | iron ammonium sulphate | 0.01 part |
| | deionised water | 2200 parts |
| Solution 2: | ammonium peroxodisulphate | 4.2 parts |
| | 1 N sulphuric acid | 25 parts |
| | deionised water | 2200 parts |
| Solution 3: | acrylonitrile | 360 parts |
| Solution 4: | vinyl chloride | 1500 parts |

The autoclave was kept filled to a level of 33 liters. 6350 parts/h of latex were removed and worked up. The latex samples removed and the polymers worked up showed the following analytical data:

| Polymerisation time (h) | Solids (%) | Cl—content (%) | N—content (%) | $(\eta)$ (dl/g) | K—value |
|---|---|---|---|---|---|
| 12 | 16.5 | 34.6 | 9.8 | 1.04 | 69 |
| 24 | 16.0 | 33.95 | 9.9 | 1.09 | 71 |
| 36 | 15.6 | 33.6 | 10.02 | 1.10 | 71.5 |
| 48 | 16.2 | 34.15 | 9.9 | 1.06 | 70 |
| 60 | 16.0 | 33.95 | 9.88 | 1.09 | 71 |
| 72 | 16.7 | 34.5 | 9.8 | 1.06 | 70 |
| 84 | 16.2 | 34.0 | 9.9 | 1.11 | 72 |

What is claimed is:

1. A process for the continuous production of a chemically uniform copolymer having improved spinning properties comprising from 15 to 50% by weight of acrylonitrile and from 85 to 50% by weight of vinyl chloride and, optionally, up to 4% by weight of at least one other copolymerised ethylenically unsaturated comonomer containing acid groups by emulsion polymerisation, wherein the copolymerisation reaction is carried out with a monomer ratio of acrylonitrile to vinyl chloride of from 0.02 to 0.5 (ratio by weight), in the presence of a redox catalyst of compounds of sulphurous acid and peroxodisulphates in a molar ratio of reducing to oxidising component of from 8:1 to 100:1 and at a pH-value of from 2.5 to 4 wherein the total concentration of redox catalyst amounts to between 0.5 and 4% by weight, based on total monomer.

2. The process of claim 1, wherein the polymerisation reaction is carried out in the presence of at least one anion-active emulsifier.

3. The process of claim 2, wherein the total concentration of said anion-active emulsifier amounts to between 0.75 and 8% by weight, based on total monomer.

4. The process of claim 2, wherein said anion-active emulsifier is sodium lauryl sulphate.

5. The process of claim 1, wherein the polymerisation reaction is carried out in the presence of an anion-active and a non-ionic emulsifier.

6. The process of claim 5, wherein said non-ionic emulsifier is a polyglycol ether.

7. The process of claim 5, wherein the total concentration of said anion-active and said non-ionic emulsifier amounts to between 0.75 and 8% by weight, based on total monomer.

8. The process of claim 5, wherein the ratio by weight of said anion-active to said non-ionic emulsifier amounts to between 10:1 and 1.5:1.

9. The process of claim 1, wherein the polymerisation reaction is carried out at a temperature of from 10° to 50° C.

10. The process of claim 1, wherein the polymerisation reaction is carried out in a cascade of several pressure-resistant and corrosion-resistant stirrer-equipped vessels.

* * * * *